Sept. 4, 1928.
Re. 17,076
C. J. JAHANT
GOLF CLUB
Original Filed Nov. 13, 1926
FIG. 1.
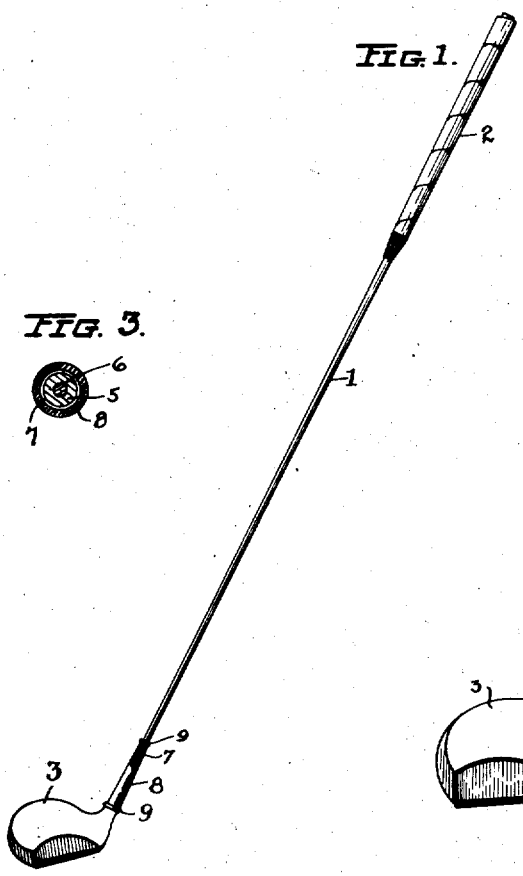
FIG. 3.
FIG. 2.
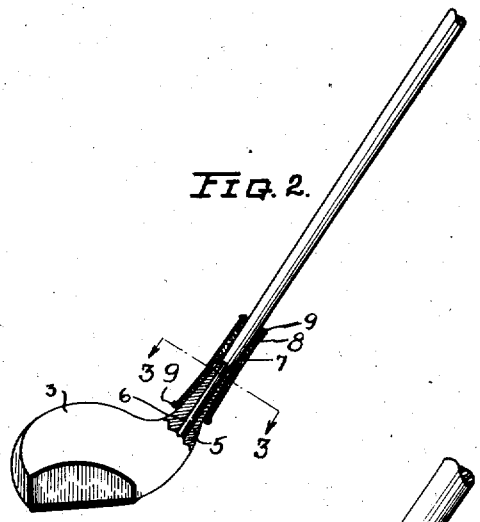
FIG. 4.
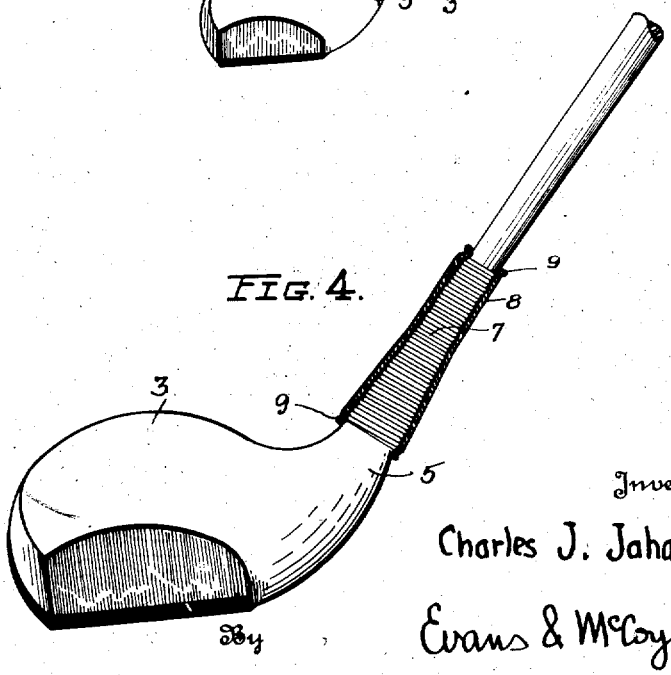
Inventor
Charles J. Jahant
By Evans & McCoy
Attorneys Reissued Sept. 4, 1928. Re. 17,076

UNITED STATES PATENT OFFICE.

CHARLES J. JAHANT, OF AKRON, OHIO, ASSIGNOR TO THE GENERAL TIRE & RUBBER COMPANY, OF AKRON, OHIO, A CORPORATION OF OHIO.

GOLF CLUB.

Original No. 1,636,514, dated July 19, 1927, Serial No. 148,221, filed November 13, 1926. Application for reissue filed January 10, 1928. Serial No. 245,713.

This invention relates to golf clubs and it has for its principal object the provision of an improved golf club accessory that is simple and economical to make and is designed to prevent the loosening and mutilation of the securing windings at the club head.

Various objects and advantages to be derived from practicing the invention will be apparent to those skilled in the art from a consideration of the accompanying drawings wherein:

Figure 1 is a side elevational view of a golf club having an accessory protecting sleeve constructed in accordance with the invention and positioned over the windings at the club head.

Fig. 2 is a side elevational view of a golf club and the accessory sleeve, with parts broken away, showing the windings, the protecting sleeve and a portion of the club head in longitudinal cross section.

Fig. 3 is an enlarged cross sectional view of the club and accessory sleeve construction taken substantially on line 3—3 of Fig. 2; and Fig. 4 is an enlarged fragmentary view of the club head and a portion of the shaft showing the protecting sleeve in section and mounted at the base of the shaft of the club.

The golf club shown in the drawings is of a conventional construction comprising a shaft 1 that has a grip portion 2 on one end and a head member 3 mounted on the reduced lower end portion of the shaft. The head portion of the club has a conventional upwardly curved neck portion 5 that is integrally formed with the head and that is provided with a slightly tapered cylindrical bore 6 which corresponds with the taper of the shaft and is adapted to receive the club shaft. The winding 7 that is also conventionally used to strengthen the connection between the shaft and the club head is wrapped tightly around the neck portion of the club head at the base of the shaft.

An open ended rubber sleeve 8, the provision of which forms the subject matter of the present invention, overlies the winding 7 at the base of the shaft and protects the winding from injuries.

Careless handling of the clubs by a player or caddy in removing the same from and returning them to the bag will result in battering the winding 7 above referred to and often the windings are thus so mutilated as to be greatly weakened or loosened. A loose winding is unsightly in appearance and it weakens the connection between the club head and the shaft.

The provision of the rubber sleeve 8 that is preferably of open end cylindrical form having beaded ends 9 protects the windings and prevents their mutilation and loosening. The sleeve is preferably formed of a high quality of very thin rubber that is sufficiently extensible to pass over the grip end of the club shaft. The sleeve snugly fits the winding at the base of the club shaft and securely holds itself in position by its inherent elasticity.

An article of this character can either be originally mounted on the club shaft by the manufacturer or supplied to the player as an accessory to be mounted in place by him. Such an accessory is particularly useful for those unskilled in the handling of golf clubs because it protects an essential part of the club construction from injury due to careless handling, thereby increasing the wearing qualities of the club, all of which will be apparent to those skilled in the art.

What I claim is:

1. A golf club comprising a shaft, a driving head formed with a tapered neck connecting portion having a bore for receiving one end of the shaft, windings wrapped around the neck portion of the head and the base of the shaft, and a removable thin walled rubber protecting sleeve entirely encasing the winding and protecting the winding, said protecting sleeve being of relatively thin, high grade rubber with beaded ends to prevent injury thereto during installation.

2. A golf club comprising a shaft, a head for the shaft having a neck portion adapted to receive one end of the shaft, a winding about the neck portion of the head and the adjacent end portion of the shaft, and a removable rubber protector adapted to entirely encase the winding and protect the winding from damage by impact against solid objects, said protecting sleeve being of relatively high grade thin rubber and being formed with beaded ends to prevent tearing thereof during its application.

Place and date, Akron, Ohio, December 16, 1927.

CHARLES J. JAHANT.